(12) United States Patent
Nunes et al.

(10) Patent No.: US 10,780,402 B2
(45) Date of Patent: Sep. 22, 2020

(54) METHODS OF MEMBRANE MODIFICATION

(71) Applicant: KING ABDULLAH UNIVERSITY OF SCIENCE AND TECHNOLOGY, Thuwal (SA)

(72) Inventors: Suzana Nunes, Thuwal (SA); Iran D. Charry Prada, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 113 days.

(21) Appl. No.: 13/861,818

(22) Filed: Apr. 12, 2013

(65) Prior Publication Data

US 2013/0277300 A1 Oct. 24, 2013

Related U.S. Application Data

(60) Provisional application No. 61/636,699, filed on Apr. 22, 2012.

(51) Int. Cl.
| | | |
|---|---|---|
| *B01D 69/02* | (2006.01) | |
| *B01D 67/00* | (2006.01) | |
| *B01D 69/14* | (2006.01) | |
| B01D 71/60 | (2006.01) | |
| B01D 71/02 | (2006.01) | |

(52) U.S. Cl.
CPC ......... *B01D 69/02* (2013.01); *B01D 67/0079* (2013.01); *B01D 67/0093* (2013.01); *B01D 69/148* (2013.01); B01D 71/024 (2013.01); B01D 71/60 (2013.01); B01D 2323/38 (2013.01); B01D 2325/36 (2013.01); B01D 2325/48 (2013.01)

(58) Field of Classification Search
CPC ................................................ B01D 67/0016
See application file for complete search history.

(56) References Cited

U.S. PATENT DOCUMENTS

| 7,148,282 B2 | 12/2006 | Giannelis et al. |
| 8,124,230 B2 | 2/2012 | Zimmerman et al. |
| 2005/0087491 A1* | 4/2005 | Hennige .............. B01D 53/228 210/640 |
| 2010/0224555 A1* | 9/2010 | Hoek et al. .............. 210/500.42 |
| 2010/0230351 A1* | 9/2010 | Hoving et al. ................. 210/650 |

(Continued)

FOREIGN PATENT DOCUMENTS

| DE | 10047551 A1 | 4/2002 |
| EP | 1191621 A2 | 3/2002 |

(Continued)

OTHER PUBLICATIONS

Li et al. "Effect of TiO2 nanoparticles on the surface morphology and performance of microporous PES membrane" Applied Surface Science 255, p. 4725-4732, Aug. 3, 2008 (Year: 2008).*

(Continued)

*Primary Examiner* — Ryan B Huang
(74) *Attorney, Agent, or Firm* — Billion & Armitage; Gregory S. Schwartz

(57) ABSTRACT

A method of manufacturing a membrane can include forming the membrane from a dissolved polymer in the presence of a functionalizing agent; and exposing the functionalizing agent to a nanoparticle to form a modified membrane.

19 Claims, 7 Drawing Sheets

(56) References Cited

U.S. PATENT DOCUMENTS

2011/0039105 A1    2/2011    Zimmerman et al.
2012/0055867 A1*  3/2012    Shih .................. B01D 67/0016
                                                              210/500.25

FOREIGN PATENT DOCUMENTS

EP            1191621 A3    3/2005
EP            1191621 B1    3/2010

OTHER PUBLICATIONS

Wu et al. "Preparation and characterization of PES/TiO2 composite membranes" Applied Surface Science 254, p. 7080-7086, May 16, 2008 (Year: 2008).*
Khodaparast, et al. "On the Impact of Functionalization and Thermal Treatment on Dielectric Behavior of Low Content TiO2/PVDF Nanocomposites" IEEE Transactions on Dielectrics and Electrical Insulation. vol. 20, No. 1, Feb. 2013, p. 166-176. (Year: 2013).*
Iijima et al. ("Surface modification for improving the stability of nanoparticles in liquid media"; KONA Powder and Particle, 27, 2009, p. 119-29; referenced as "Iijima-A") (Year: 2009).*
Iijima et al. ("Tuning the stability of TiO2 nanoparticles in various solvents by mixed silane alkoxides"; Journal of Colloid and Interface Science, 337, 2009, p. 61-65; referenced as "Iijima-B") (Year: 2009).*
Bergamasco, et al., "Drinking water treatment in a gravimetric flow system with TiO2 coated membranes", Chemical Engineering Journal 174 (2011) 102-109.
Brinker, "Hydrolysis and Condensation of Silicates: Effects on Structure", Journal of Non-Crystalline Solids 100 (1988) 31-50.
Cassie, "Contact Angles", Jan. 27, 1948, 6 pages.
Cassie, et al., "Wettability of Porous Surfaces", Jan. 19, 1944, 6 pages.
Chau, et al., "A review of factors that affect contact angle and implications for flotation practice", Advances in Colloid and Interface Science 150 (2009) 106-115.
Huang, et al., "Superhydrophilic porous TiO2 film prepared by phase separation through two stabilizers", Applied Surface Science 257 (2011) 4774-4780.
Kim, et al., "Design of TiO2 nanoparticle self-assembled aromatic polyamide thin-film-composite (TFC) membrane as an approach to solve biofouling problem", Journal of Membrane Science 211 (2003) 157-165.
Kwak, et al., "Hybrid Organic/Inorganic Reverse Osmosis (RO) Membrane for Bactericidal Anti-Fouling. 1. Preparation and Characterization of TiO2 Nanoparticle Self-Assembled Aromatic Polyamide Thin-Film-Composite (TFC) Membrane", Environ. Sci. Technol. 2001, 35, 2388-2394.
Li et al., "Effect of TiO2 nanoparticles on the surface morphology and performance of microporous PES membrane", Applied Surface Science 255 (2009) 4725-4732.

Madaeni, et al., "Characterization of self-cleaning RO membranes coated with TiO2 particles under UV irradiation", Journal of Membrane Science 303 (2007) 221-233.
Nistor, et al., "Organic-Inorganic CO2 Selective Membranes Prepared by the Sol-Gel Process.", Separation Science and Technology, 2009, 44(14): p. 3392-3411.
Nunes, et al., "Inorganic modification of proton conductive polymer membranes for direct methanol fuel cells", Journal of Membrane Science 203 (2002) 215-225.
Nunes, et al., "Membranes of poly(ether imide) and nanodispersed silica", Membranes of poly(ether imide) and nanodispersed silica.
Pezzin, et al., "Modification of proton conductive polymer membranes with phosphonated polysilsesquioxanes", Journal of Membrane Science 325 (2008) 559-569.
Ponce, et al., "Membranes for direct methanol fuel cell based on modified heteropolyacids", Desalination 162 (2004) 383-391.
Rahimpour, et al., "Coupling TiO2 nanoparticles with UV irradiation for modification of polyethersulfone ultrafiltration membranes", Journal of Membrane Science 313 (2008) 158-169.
Rao, et al., "w-temperature synthesis of TiO2 nanoparticles and preparation of TiO2 thin films by spray deposition", Solar Energy Materials & Solar Cells 91 (2007) 1075-1080.
Razmjou, et al., "The effects of mechanical and chemical modification of TiO2 nanoparticles on the surface chemistry, structure and fouling performance of PES ultrafiltration membranes", Journal of Membrane Science 378 (2011) 73-84.
Razmjou, et al., "Titania nanocomposite polyethersulfone ultrafiltration membranes fabricated using a low temperature hydrothermal coating process", Journal of Membrane Science 380 (2011) 98-113.
Sabzi, et al., "rface modification of TiO2 nano-particles with silane coupling agent and investigation of its effect on the properties of polyurethane composite coating", Progress in Organic Coatings 65 (2009) 222-228.
Syafei, et al., "Removal of natural organic matter by ultrafiltration with TiO2-coated membrane under UV irradiation", Journal of Colloid and Interface Science 323 (2008) 112-119.
Ukaji, et al., "The effect of surface modification with silane coupling agent on suppressing the photo-catalytic activity of fine TiO2 particles as inorganic UV filter", Applied Surface Science 254 (2007) 563-569.
Wenzel, "Resistance of solid surfaces to wetting by water", Industrial & Engineering Chemistry, 1936. 28(8): p. 988-994.
Witucki, "A Silane Primer: Chemistry and Applications of Alkoxy Silanes", 57th Annual Meeting of the Federation of Societies for Coatings Technology, Oct. 21, 1992, Chicago, IL, 4 pages.
Yang, et al., "The influence of nano-sized TiO2 fillers on the morphologies and properties of PSF UF membrane", Journal of Membrane Science 288 (2007) 231-238.
Zhao, et al., "Surface modification of TiO2 nanoparticles with silane coupling agents", Colloids and Surfaces A: Physicochem. Eng. Aspects 413 (2012) 273-279.

* cited by examiner

METHODS OF MEMBRANE MODIFICATION

CLAIM OF PRIORITY

This application claims the benefit of prior U.S. Provisional Application No. 61/636,699, filed on Apr. 22, 2012, which is incorporated by reference in its entirety.

TECHNICAL FIELD

This invention relates to a modified polymer membranes and methods of manufacturing modified polymer membranes.

BACKGROUND OF THE INVENTION

Polymer membranes can be used in a variety of applications. For example, polymer membranes can be used in water separation or purification systems, gas separation or purification systems, membrane reactors, electrochemical cells, drug delivery devices and other systems. The properties of the surfaces and pores of the membrane can determine the usefulness of the membrane for particular applications.

SUMMARY

A method of forming the membrane can include dissolving the polymer in an organic solvent and casting the membrane. For example, casting the membrane can include phase inversion casting.

In one aspect, a method of manufacturing a membrane includes forming the membrane from the dissolved polymer in the presence of a functionalizing agent, and exposing the functionalizing agent to a nanoparticle to form a modified membrane.

In another aspect, a membrane includes a porous polymer layer including a functionalizing agent and a nanoparticle.

In certain embodiments, the method includes casting the membrane. The method can further include dissolving the polymer in an organic solvent. Forming the membrane can include phase inversion.

The nanoparticle can include functional groups. The nanoparticle can be Ag, Au, titania, zirconia, ceria, a rare earth oxide or silica. The functionalizing agent can include a metal alkoxide or silane. The silane can be tetraethylorthosilicate, silicon tetrachloride, silanol-terminated polydimethylsiloxane, chlorine-terminated polydimethylsiloxane, ethoxy-terminated polydimethylsiloxane, methoxy-terminated polydimethylsiloxane, triethoxysilylethyl-terminated polydimethylsiloxane, dimethylamino-terminated polydimethylsiloxane, (3-glycidyloxypropyl)trimethoxysilane, $N^1$-(3-trimethoxysilylpropyl)diethylenetriamine, or a Z-terminated alkoxy or halo silane in which Z is a moiety that is compatible with, soluble within, or reacts with a nanoparticle or a functional group on the nanoparticle. Z can be hydroxy, sulfhydryl, sulfinate, sulfinic acid, epoxy, sulfonate, sulfonic acid, disulphide, carboxyl, carboxylate, amine, amide, alkoxysilyl, halosilyl, phosphate, phosphonic acid, phosphonate ester, phosphinate, phosphinic acid, or phosphinate ester.

Other aspects, embodiments, and features will be apparent from the following description, the drawings, and the claims.

DETAILED DESCRIPTION OF THE DRAWINGS

FIG. 1 is a diagram depicting a general surface nanostructure process of: a) functionalization of a nanoparticle; b) a polysiloxanes network in a polymer matrix; or c) selective attachment of nanoparticles onto a membrane surface.

FIG. 2 is a graph depicting contact angle, pore size and field emission scanning electron micrographs (FESEM) microscopy of membranes prepared from polyethyleneimine (PEI) casting solutions with and without polysilsesquioxane from polycondensation of $N^1$-(3-trimethoxysilylpropyl)diethylenetriamine (GMS) in different coagulation baths; larger area of (f) membrane prepared from PEI/GMS casting solution coagulated in 65° C. nanoparticle dispersion (all membranes FESEM image with the same magnification).

DETAILED DESCRIPTION OF THE INVENTION

Figure 1:
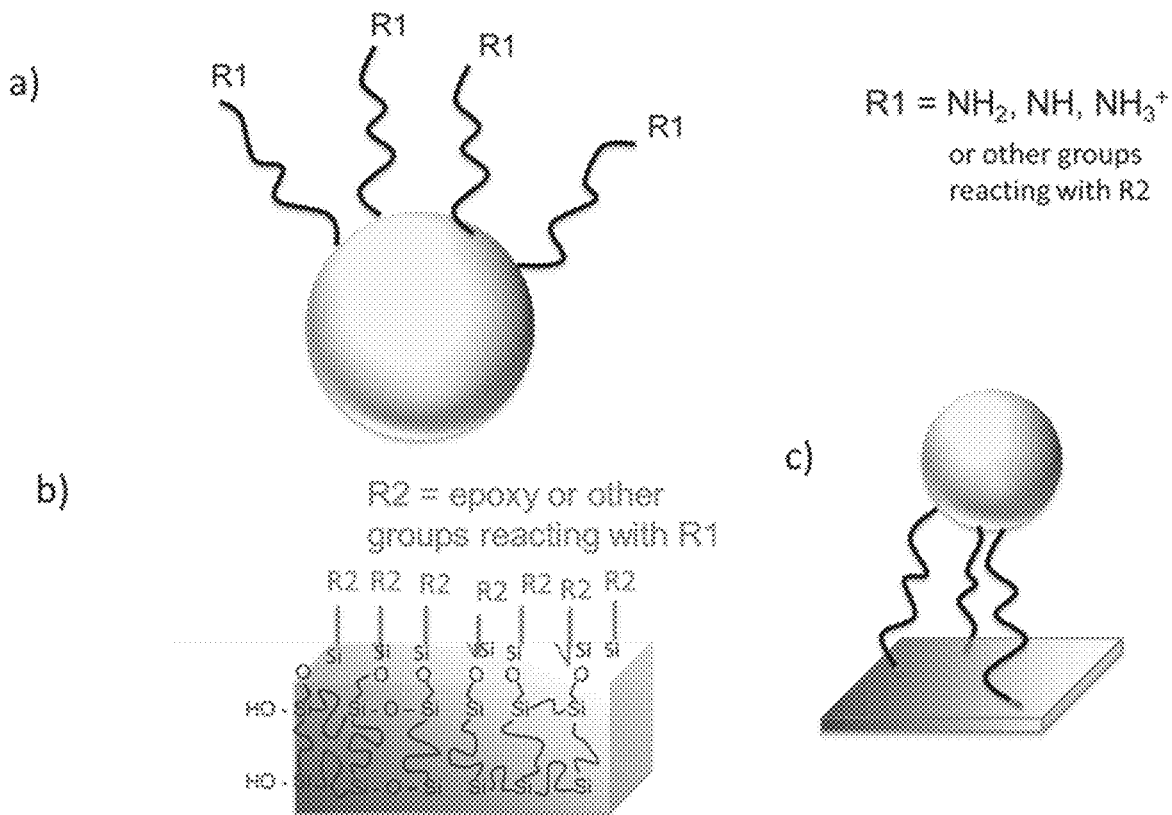
Figure 2:
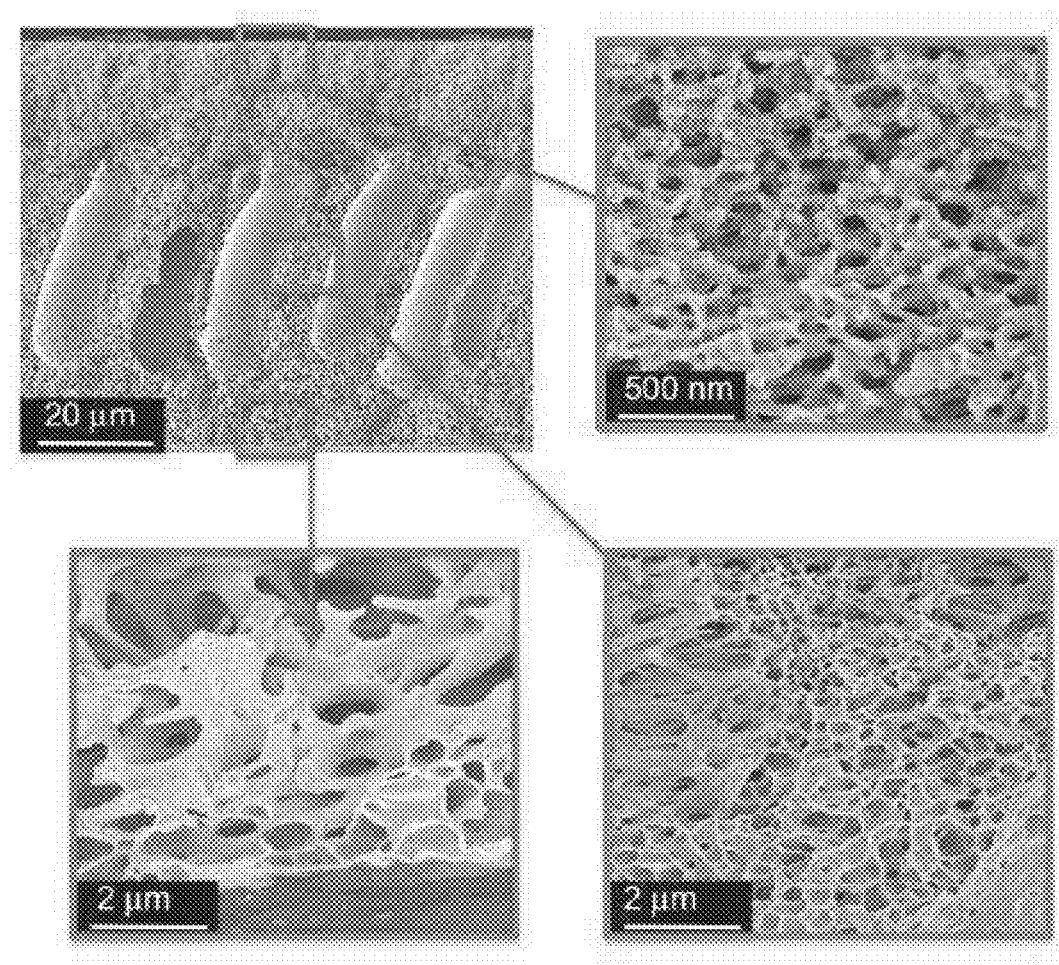

Membranes are important in separation processes, such as water reuse, for instance, ultrafiltration and forward osmosis or other membrane technologies. A well-known problem in the membrane field is fouling during the separation process, for example, by the adhesion of mainly organic solutes or biological microorganisms to the surface of membranes. The fouling can cause flux reduction and can lead to pore blocking. Surface functionalization can make the membrane more hydrophilic. Alternatively, or in addition, creation of surface nanostructures can help reduce or minimize the fouling problem. In order to reduce or prevent biofouling, for example, biocide nanoparticles such as silver, copper or metallic oxides can be affixed to the membrane surface or pores. Another application for modified membranes is in membrane reactors. For example, metallic particles or nanoparticles affixed to a surface of a porous polymer membrane can be used as a catalyst. Uniform distribution of the particles, stability and accessibility on the membrane can be provided, improving the use of the modified membrane in a reactor.

In general, a method of forming a polymer membrane can include attaching nanoparticles to a surface or pores of the membrane can produce modified membranes that are tailored for particular uses. The method achieves a good distribution of nanoparticles throughout the membrane, and can provide access to the particles on the surface of the membrane while having a strong and stable connection to the membrane. These features can improve the lifespan of the membrane for the purpose, and can avoid leaching out or other degradation during operation. The method provides a simple way to attach particles to the surface, without additional polymer functionalization.

Examples of potential uses for modified membranes include for organic-inorganic membranes for fuel cells (see, for example, EP1191621 B1, which is incorporated by reference in its entirety), heteropolyacid modified membranes (see, for example, M. L. Ponce, L. A. S. de A. Prado, V. Silva and S. P. Nunes "Membranes for direct methanol fuel cell based on modified heteropolyacids" *Desalination*, 162 (1-3): 383-391 (2004), which is incorporated by reference in its entirety), or silane functional polymer membranes (see, for example, S. P. Nunes, K. V. Peinemann, K. Ohlrogge, A. Alpers, M. Keller and A. T. N. Pires. "Membranes of poly(ether imide) and nanodispersed silica." *Journal of Membrane Science* 157 (1999) 219, which is incorporated by reference in its entirety. In each of these examples, benefits would be obtained by using the modified membranes described herein.

There are two exemplary approaches to making the modified membrane utilizing a functionalizing action, such as a metal alkoxide or silane, and a nanoparticle or polymer.

In one approach, a preformed membrane can be immersed in a dispersion containing nanoparticles, which have been previously functionalized with active groups, which react with the groups available in the membrane. In certain embodiments, heat or irradiation can be used to promote the reaction. For example, a preformed membrane can be immersed in the dispersion of functionalized particles and heat it just enough to promote the reaction between a particle functional groups (such as an amine) and a chemical groups added by a silane to the modified membranes (such as an epoxy). Organically modified silanes can be commercially available as coupling agents and as long the morphology of the membrane is controlled, a suitable organically modified silane can be added to the polymer casting solution. Alternatively, it can be possible to chemically modify the organic polymer of the membrane to react with nanoparticles.

In another approach, the membrane can be coagulated in a bath containing functionalized nanoparticles and can be allowed to react at the same time that the pores are formed through the process of reactive phase inversion. This approach can be extended also to other systems, without nanoparticles, including with other reactive monomers, crosslinkers, or other compound, in a coagulation bath. Reactive phase inversion could use a reactive polymer instead of nanoparticles. A typical procedure of preparation of asymmetric porous membranes can include dissolving the polymer, casting the solution with doctor blade on a substrate, such as a glass plate or non-woven support, and immersing the membrane in water. By a process, known in the membrane field as phase inversion process, an asymmetric porous structure is formed, with smaller pores on the top of the membrane and a gradient of pores with increasing pore size down to the bottom of the membrane. The water can be in a coagulation bath. By forming the membrane in a reactive solution, where functionalized nanoparticles are dispersed and the functional groups are available for reaction, reactive phase inversion (RPI), and leading to the modified membrane structure. Other reactive agents like crosslinker could be present in the coagulation bath and react with chemical groups in the incipient membrane during the pore formation. The resulting membrane can be stable to solvents or can induce target functionalization inside the pores while they are being formed.

For example, the nanoparticles can be attached by adding organically functionalized silanes to a casting solution and promoting silane polymerization to form an inorganic polymer (polysilsesquioxane). The silane is chosen to contain a functional group that is reactive with the nanoparticles. The functional group can be, for example, an epoxy, which can be used to attach to the nanoparticles. For example, an asymmetric porous membrane can be prepared by a conventional phase inversion method whereby an epoxy group becomes exposed to pore walls of the membrane and the membrane surface.

Suitable polymers can include polyolefins, ethylene-propylene rubbers, ethylene-propylene-diene monomer terpolymers (EPDM), polystyrenes, polyvinylchloride (PVC), polyamides, polyacrylates, celluloses, polyesters, polyethers, polysulphones, polyazoles (ie., diazole, triazole), polyvinylhalides, polyhalocarbons, polyethyleneimine, or polymers or copolymers of ethylene, propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. Preferred polymer materials include polyetherimides, polyacrylonitriles, polysulfones, polyoxadiazoles, polytriazoles, or polyvinylfluorides.

Suitable nanoparticles can include inorganic particles, clusters, or nanowires, such as inorganic, organic, semiconducting, metallic, metal oxide, transition metal oxide, crystalline, or magnetic particles. Examples include Ag, Au, titania, zirconia, ceria, a rare earth oxide or silica. Other examples of nanoparticles are described, for example, in U.S. Patent Publication 20110039105, U.S. Pat. Nos. 8,124,230, and 7,148,282, each of which is incorporated in its entirety. In certain embodiments, the nanoparticle includes one or more functional groups on a surface of the nanoparticle. The functional group can be hydroxy, thio, amino, carboxy, or any other group capable of reacting with the functionalizing agent.

Suitable functionalization agent can include a metal alkoxide or a silane. The silane can include tetraethylorthosilicate, silicon tetrachloride, silanol-terminated polydimethylsiloxane, chlorine-terminated polydimethylsiloxane, ethoxy-terminated polydimethylsiloxane, methoxy-terminated polydimethylsiloxane, triethoxysilylethyl-terminated polydimethylsiloxane, dimethylamino-terminated polydimethylsiloxane, (3-glycidyloxypropyl)trimethoxysilane, $N^1$-(3-trimethoxysilylpropyl)diethylenetriamine, or a Z-terminated alkoxy or halo silane in which Z is a moiety that is compatible with, soluble within, or reacts with a nanoparticle or a functional group on the nanoparticle. For example, Z can be hydroxy, sulfhydryl, sulfinate, sulfinic acid, epoxy, sulfonate, sulfonic acid, disulphide, carboxyl, carboxylate, amine, amide, alkoxysilyl, halosilyl, phosphate, phosphonic acid, phosphonate ester, phosphinate, phosphinic acid, or phosphinate ester.

Suitable silanes, functionalized nanoparticles or other materials can be purchased commercially or prepared by ordinary synthetic organic techniques.

For example, membranes with very regular distribution of $TiO_2$ nanoparticles were prepared aiming at antifouling and/or separation coupled to photocatalytic applications. Particles and membrane surfaces were modified with organoalkylsilanes having reactive functional groups. Reaction between added epoxy and amino functional groups led to asymmetric polyetherimide porous membranes with $TiO_2$ decorated surface. Leaching tests confirmed the strong attachment of the particles to the polymer surface. Excellent properties were obtained, such as hydrophilicity and thermal stability up to temperatures close to 260° C. The average pore size was 134±17 nm, in the range of ultrafiltration. The particle size and electrophoretic mobility was measured by dynamic light scattering (DLS); thermal stability was confirmed by TGA and DSC. Chemical characterization was performed by FTIR, NMR and EDS. Wettability was evaluated by contact angle measurements and the morphology was investigated by FESEM.

Among metal oxide nanoparticles, $TiO_2$ has attracted interest for application in membrane technology due to its bifouling control ability, photocatalytic and ultrahydrophilicity properties. In terms of fouling mitigation, $TiO_2$ has proved to diminish the irreversible fouling without compromising the flux of ultrafiltration and reverse osmosis membranes. They also exhibit antibacterial effect against *Escherichia coli* (*E. coli*) [1-3]. The photocatalytic and ultrahydrophilicity properties are related to self-cleaning performance added to surfaces. Photocatalytic activity leads to total or partial decomposition of organic matter as trichlorophenol, recalcitrant pollutants and toxic organic substances [3-5]. Ultrahydrophilicity allows eliminating the remaining contaminants from the surface by simple rinsing [4, 6]. In addition, some other well-known attractive properties of $TiO_2$ particles include a good chemical stability, UV-filter capability, optical properties, wide availability and low cost [7, 8]. The integration of $TiO_2$ nanoparticles and polymeric membranes has been reported through different techniques, which include the blending of nanoparticles into the membrane and the deposition onto the membrane surface. Mixed-matrix membranes have been prepared by trapping or assembly in the bulk, but they have shown a very poor distribution and alteration of the mechanical membrane properties [3, 9, 10]. Particle surface coating has been reported by spray deposition technique [11], and low temperature-hydrothermal (LTH) process [10], which resulted in particles aggregation, then being more useful for nonporous solid surfaces or fibers; also coating by plasma treated surfaces and by pulse-frequency d.c. reactive magnetum sputtering methods have been explored [12], which due to the high interaction of the pulse frequency with the surface not only alter the pore properties but also tend to produce a non-homogeneous coating and even damage to the membrane. Moreover, bulk incorporation of $TiO_2$ nanoparticles with combination of subsequent dipping in particles suspension for membranes has been documented but with aggregation at the surface of polysulfone membranes [6]. They also may cause pore plugging and instability of the coating layer [9]. However, even with the reported drawbacks the use of organic-inorganic materials for membrane preparation can be very successful if carefully explored, Organoalkoxysilanes have been previously used for building a phosphonated network or incorporating phosphate particles to increase proton conductivity of polymer membranes for fuel cell application as reported by Pezzin et al and Nunes et al [13, 14]. Organoalkoxysilanes have been used also to improve the mechanical resistance to membranes under pressure [15] and reduce swelling of membranes used for gas separation and direct alcohol fuel cell [14, 16].

Silane coupling agents have proved to be effective for grafting onto particles surface [7]. They can be used for surface modification of nanoparticles and for improving dielectric and wetting properties of organic-inorganic composites. The first step for a successful membrane surface modification with nanoparticles is the functionalization of the particles alone. Stabilization of colloidal dispersion is needed to avoid aggregation. In this work the particle functionalization has also the final goal of chemical binding on the membrane functionalized surface.

In summary, the main objective of this work is the preparation and characterization of a novel nanostructured membrane with $TiO_2$ nanoparticles, with excellent distribution and stable attachment on the membrane surface and in the pore walls. A combination phase inversion for membrane preparation with reactive processes facilitates stable and homogeneous functionalization.

EXPERIMENTAL

For the surface functionalization of $TiO_2$ particles, commercial $TiO_2$ nanoparticles, a mixture of rutile and anatase (<150 nm particle size (DLS), dispersion, 33-37 wt. % in $H_2O$) and N1-(3-trimethoxysilylpropyl)diethylenetriamine were bought from Sigma-Aldrich. The particles were purified by dialysis using SnakeSkin dialysis tubing (7K MWCO 35 ft. (10.5 m)) supplied by Thermo-Scientific.

Polyetherimide-sulfone (PEI), Extem XH1015, was kindly supplied by Sabic and anhydrous dimethylformamide (DMF) from Sigma Aldrich was used for preparation of asymmetric porous membranes. Glycidoxypropyltrimethoxysilane (GMS) from Acros Organics was used for the membrane functionalization.

The particles were prepared and the membranes were casted using deionized water prepared with a MilliQ water purification system. Chemicals were used without further purification.

The surface functionalization of commercial $TiO_2$ nanoparticles was performed mixing 150 mL of 1M $TiO_2$ nanoparticles dispersion in DI water and 10 mL of 10 vol % solution of N1-(3-trimethoxysilylpropyl)diethylenetriamine. The dispersion was placed into a Parr reactor at 60° C. and 60 bar of $CO_2$ for 8 hours under stirring at 300 rpm.

Afterwards, the solution was dialyzed up to four days to remove any unreacted chemical remaining in solution. Finally, the colloidal dispersion was diluted 10 times in volume.

Membrane Functionalization with Epoxy-Organopolysiloxane Network

Glycidoxypropyltrimethoxysilane (10 wt % to PEI) was added dropwise to 20 wt % polyetherimide solutions in DMF. After 2 hours, HCl 0.1M was added to the mixture (3:2 acid molar ratio to silane). The resulted mixture was stirred for three days in order to promote the network formation by sol-gel process.

Membranes Preparation

The preparation of asymmetric membranes by phase inversion consisted of the following steps: (1) casting of a 100-μm-thick film on a glass plate with a doctor blade, (2) immersion in a coagulation bath (water) at two different evaluated conditions: room temperature and 65° C. for 12 hours, and (3) drying at ambient conditions.

For surface attachment of $TiO_2$ nanoparticles, the usual non-solvent bath (water) was substituted by a particles dispersion. Remaining steps were developed as explained before.

Size and electrophoretic mobility were determined on a Malvern Zetasizer Nano-ZS.

Fourier Transform Infrared-Attenuated Total Reflectance (FTIR-ATR) spectra were recorded on a FTIR Nicolet iS10 with a Universal ATR accessory equipped with a single reflection diamond crystal for membranes samples and KBr pellets for powders.

$^1H$ NMR spectra of 5-10% (w/w) solutions of the final polymers in DMF-d7 with $Si(CH_3)_4$ as an internal standard were recorded at room temperature at 600 MHz SB Liquid NMR Spectrometer (Bruker).

Differential scanning calorimetry (DSC) was carried out on a Perkin-Elmer DSC 204 F1 NETZSCH under nitrogen flow. The heating rate was 5° C. min$^{-1}$ and the cooling rate was 10° C. min$^{-1}$ in the range of temperature from 25 to 220° C. The samples were placed in aluminum pans and heated from 25 to 220° C. under nitrogen flow rate. For all samples, an isotherm was recorded at 220° C. for 15 minutes. The glass transition temperature ($T_g$) of each sample was determined from the second heating scan.

Thermogravimetric analysis (TGA) was conducted on TA instrument TA/TGA Q50 with a heating rate of 5° C. $min^{-1}$ under nitrogen flow up to 800° C. Colloidal dispersions were previously freeze-dried for this characterization.

Surface and cross section morphology were examined by field emission scanning electron microscopy (FESEM) in a FEI Nova™ NanoSEM 630. The samples were sputter coated with platinum for 30 s at 20 mA to prevent electron charging. All the images were taken using a TLD—secondary electrons detector in immersion mode, 2 KV voltage, working distance of 3 mm and spot size between 1.5 and 2. Images were obtained at different magnifications. The samples for cross-sectional images were previously freeze-fractured in liquid nitrogen.

Composition analyses for the membranes were acquired from characteristic Energy-dispersive X-ray spectroscopy (EDS) at 10 KV, working distance of 5 mm and spot size 6. Different EDAX techniques were explored on this work such as elemental analysis, and line and mapping scans.

Stationary contact angle measurements for the membranes were performed in Krüss Easydrop equipment.

Leaching Tests

The strength of the interaction between particles and PEI membranes was evaluated by leaching tests using DI water as solvent, for three days. The samples were washed with periodic changes of water in order to avoid the saturation of the aqueous phase with inorganic components.

A simple method of porous membrane functionalization was directed at improved fouling resistance, as well as the possibility of extending the application for catalytic active systems. The idea is to add complementing reactive functionalities to particles and membranes, by working with organosilanes. The use of silanes for modification of polymeric membranes has been reported to improve the mechanical stability as far as compaction and resistance to swelling is concerned [14-16]. Careful morphology control is required when silane is added to the casting solution. The preparation steps include (i) particle functionalization with amino silane (FIG. 1a), (ii) casting of organo-inorganic solution with epoxy-functionalized surface (FIG. 1b) and (iii) reactive/phase inversion in water with dispersed functionalized $TiO_2$ leading to covalent attachment onto membrane surface (FIG. 1c).

Surface Functionalization of $TiO_2$ Nanoparticles $TiO_2$ nanoparticles were modified by grafting amino functional groups onto the particles surface, by reaction with amino silanes. FIG. 1 (a) shows the possible chemical titania functionalization, which result from the silane reaction on the particles surface. The most probable reaction is directly between the surface hydroxyl groups and silane through —Si—O— groups, as part of the condensation and hydrolysis process; however bonding of primary amino to $^-OH$ groups is also possible, as well as electrostatic interaction between $NH_3^+$ (protonated amine) and $^-OH$ groups [7, 17]. The zeta potential increases from (0.5±1.5) mV to (42±9) mV after modification of $TiO_2$ particles, indicating that protonation has taken place, According to DLS measurements, the functionalization process led to an increase in particles size from ~47 nm to ~92 nm probably due to bridging after condensation between different alkoxysilane chains linked to different particles in the dispersion. The grafting success was confirmed by FTIR.

Organo-Inorganic Membrane Casting and Pore Morphology Control

FIG. 1(b) represents the polyetherimide/polysilsesquioxane blend with reactive epoxy groups, which constitutes the membrane to be linked to amino-functionalized particles. The polysilsesquioxane formation was optimized, by taking in account classical sol-gel reports of Brinker [19] and Witucki [20] to avoid reverse reaction from siloxane network to silanol. Acid catalysis (0.1M HCl), $H_2O/Si$ molar ratio 1.5 and 3 days stirring of solutions in DMF at room temperature. FTIR spectra evidenced the network formation at the optimized conditions.

Figure 3:
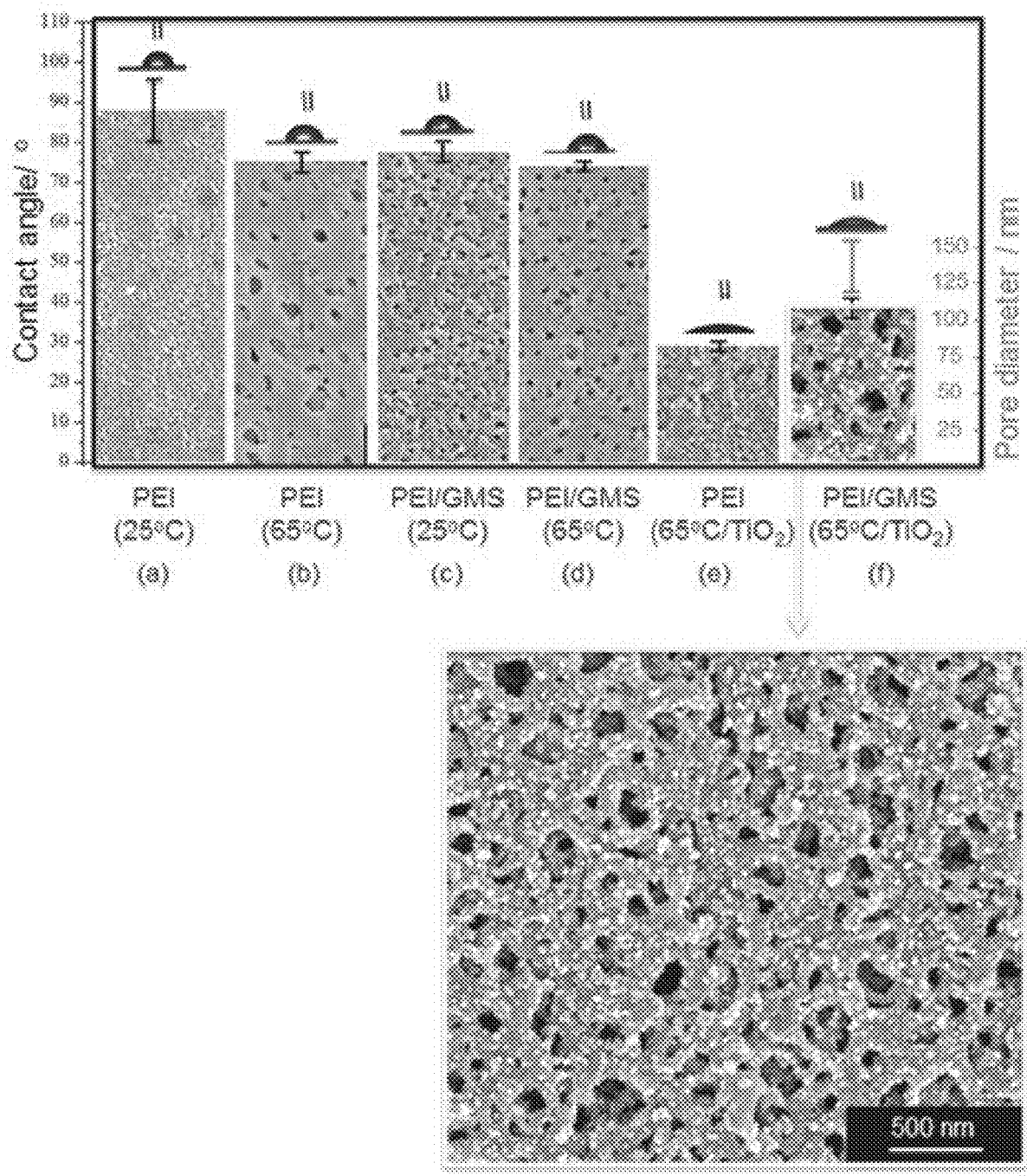
FIG. 3 is a series of micrographs depicting detailed cross section field emission scanning electron micrographs (FESEM) of asymmetric PEI membrane modified with nanoparticles.

Asymmetric porous membranes were prepared by casting PEI solutions on glass plates, followed by immersion in water. When the temperature of the coagulation bath is increased, larger pores are formed and the contact angle slightly decreases (Comparison between FIGS. 3a and 3b). It is known that surface texture influences the contact angle and porosity can lead to super hydrophobicity as well as super hydropholicity, according to Cassie and Wenzel models [21-24]. A marginal contact angle decrease is observed when epoxysilsesquioxane is incorporated (FIGS. 3c and 3d). Much lower contact angles could be measured when $TiO_2$ functionalized particles were attached to the membranes (FIGS. 3e and 3f). For that the particle functionalization itself, which is highly hydrophilic, might have a large contribution. Furthermore the Wenzel equation [23, 25] predicts a decrease of contact angle when the features at the surface favor the liquid penetration into the roughness grooves (gaps between the peaks). The attached particles act as features (FIG. 3O, which are smaller in size than the water drop dimension, increasing the wettability of analogous non-functionalized PEI membranes [23, 25] with similar pore size (FIG. 3b).

Without the epoxy-silsesquioxane network, the particles tend to aggregate on the membrane surface and plug the pores.

Figure 5:
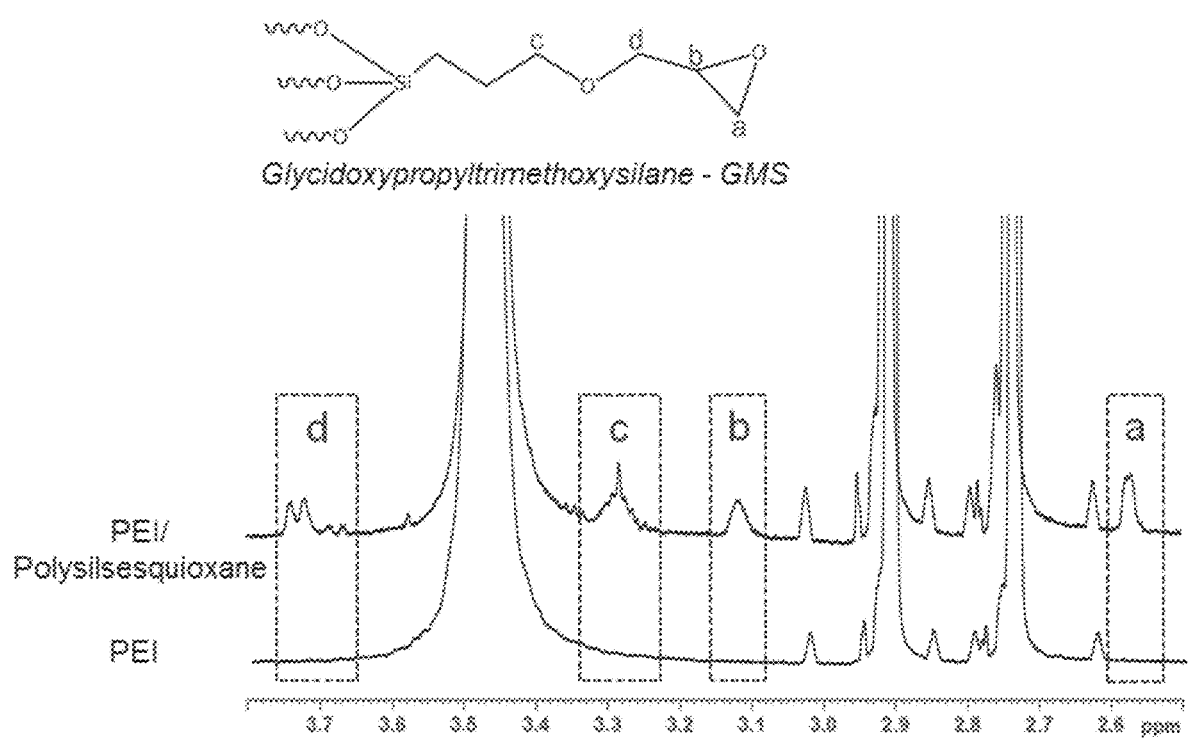
FIG. 5 is a graph depicting $^1$H NMR (600 MHz, 297K, CDCl3, ppm) spectra of PEI membranes with and without polysilsesquioxane.

Reactive Phase Inversion and Surface Attachment of $TiO_2$ Nanoparticles onto PEI Membranes One of the best nanostructured membrane was cast from PEI solutions containing epoxy polysilsesquioxane immersed in the dispersion of $TiO_2$ particles. The sol-gel process leading to the formation of polysilsesquioxane in the PEI solution does not open the epoxy groups as confirmed by NMR. The characterization is shown as supplementary information (FIG. 5). For the successful attachment of $TiO_2$ particles the phase inversion process usually leading to the formation of asymmetric porous membranes was also a reactive process. As the incipient membrane is being formed, with the usual water-solvent exchange, followed by pore formation, the casting solution and particularly the epoxy groups are exposed to the amino-functionalized particles. Reaction between amino and epoxy groups takes place as depicted in FIG. 1c. During the immersion/coagulation step the polymer (PEI and polysilsesquioxane) chains have high mobility. As phase separation takes place to form and solidify the pore structure, it is expected that the epoxy groups tend to be preferentially placed in the polymer-water interface and react to amino groups available in the functionalized particles. Reactions of primary amine/epoxy and secondary amine/epoxy are possible at 65° C. In absence of a proton donor, the secondary amine has a dual role not only by forming an intermediate complex with the epoxy, but also as a nucleophilic reagent attacking preformed epoxy-amine complexes.

The reactive phase inversion led to uniformly attached particles onto PEI surface. The observed mean pore diameter was 134±17 nm, making the membrane suitable for ultrafiltration applications such as waste water treatment with photocatalytic and biofouling control properties coming from the attached inorganic particles. In addition, this membrane exhibited good wettability as shown in the FIG. 3f.

Figure 4:
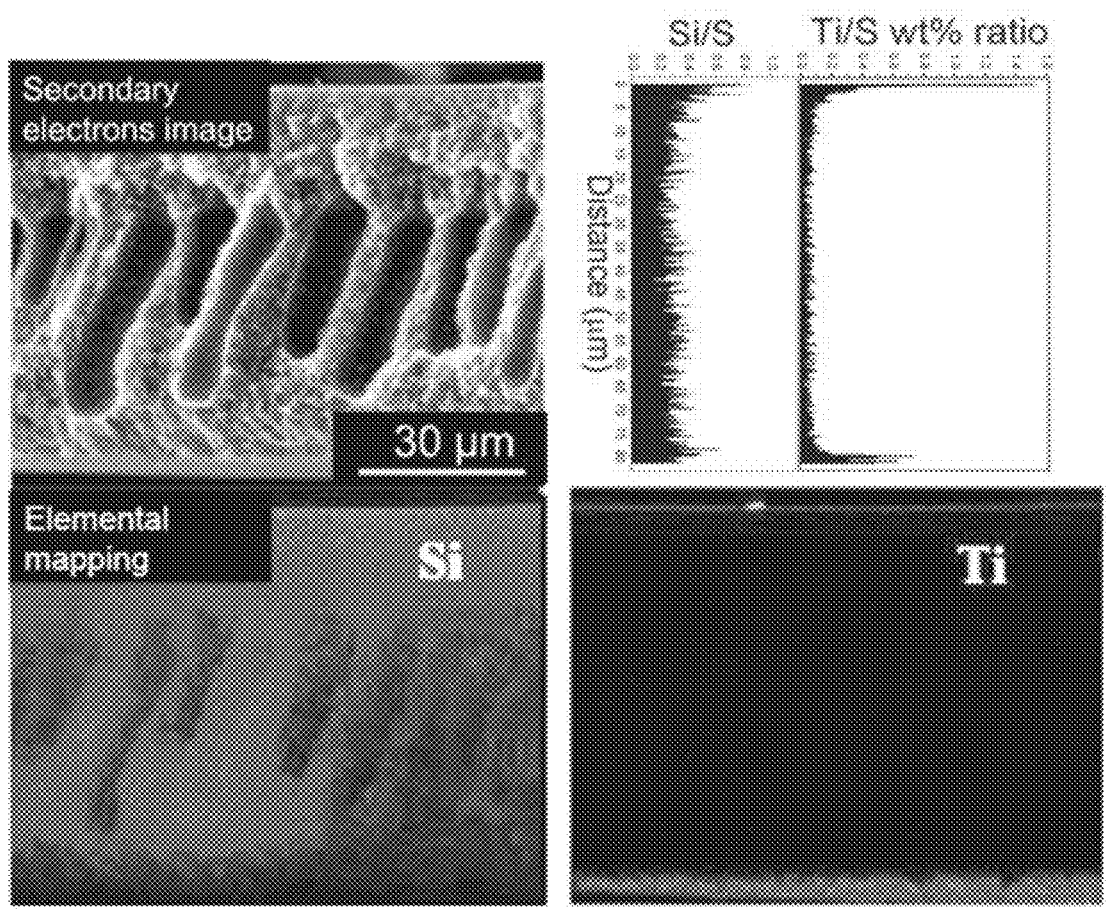
FIG. 4 is a series of micrographs depicting secondary electron image of a functionalized membrane cross-section (from top (0 micrometer) to bottom (85 micrometer)) and its Energy Dispersive Spectroscopy Analysis (EDS): Line-scan and elemental mapping of Si and Ti.

Cross-section FESEM images of the functionalized asymmetric membrane with $TiO_2$ nanoparticles are shown in the FIG. 4. Sponge-like morphology dominates, which is positive from the point of view of mechanical stability and resistance to compaction when working at high pressure. Finger-like cavities are only present in the center of the membrane. It is clear that the $TiO_2$ particles are preferentially distributed in the external membrane layers, which were in more direct contact to the particle dispersion during the membrane formation. Particularly in the top layer a large density of $TiO_2$ particles can be seen, which are not only on the membrane top surface, but mostly placed on the pore walls. This is relevant since in operation not only the top flat surface should be protected from fouling, but also the pore entrance. Furthermore when catalytic activity is aimed, the pore functionalization offers a longer contact time between active particles and pollutant molecules to be converted.

The distribution of inorganic phase in the PEI porous membrane was confirmed by Energy Dispersive X-Ray Spectroscopic Analysis (EDS) shown in FIG. 5 along the cross-section. S is present only in the organic polymer (sulfone groups) and the Ti signal comes exclusively from the $TiO_2$ particles. The Ti/S ratio (line-scan) is a semi-quantitative indication of how the particles are distributed. They are mostly attached in the surface layers, the highest particle density being found up to 3 μm from the surface (both sides). The Si signal comes from the polysilsesquioxane and from the functionalization of the $TiO_2$ particles. The Si/S ratio is relatively uniform in the center (up to 5 μm from the surface) of the membrane cross-section. If we discount the small increase of Si sign close to the surface, which can be assigned to the attached particles, we can conclude that the polysilsesquioxane phase is homogeneously distributed all over the membrane. This is confirmed by the images obtained in elemental mapping mode both for Si and Ti.

Figure 6:
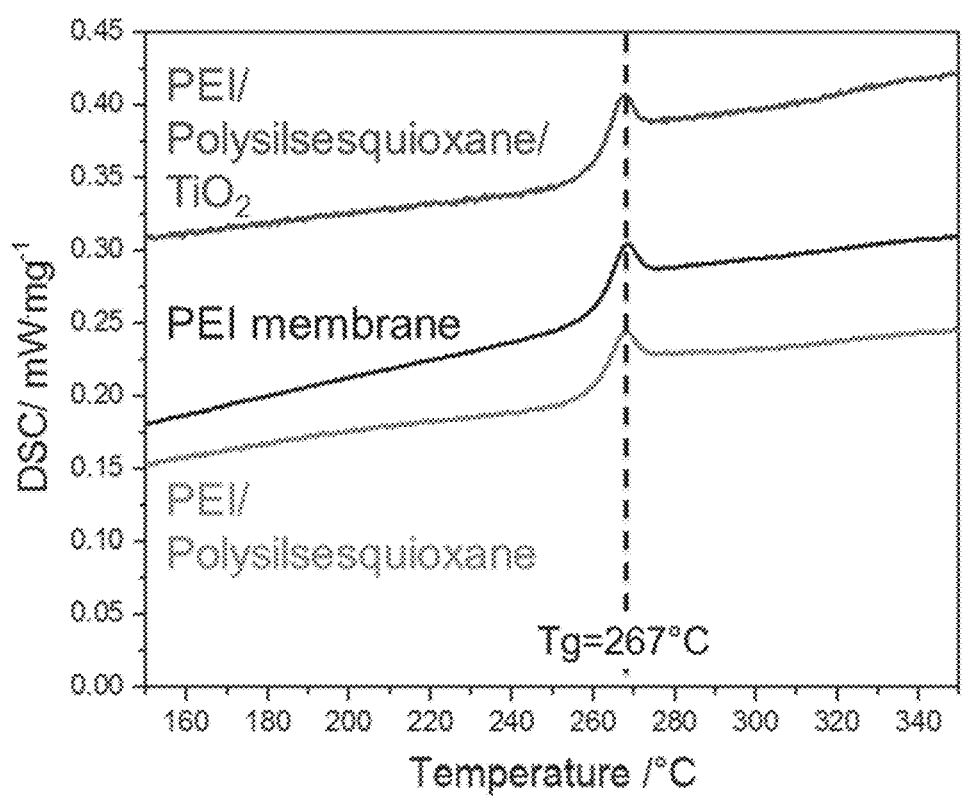
FIG. 6 is a graph depicting experimental DSC-thermograms of the PEI membranes.
Figure 7:
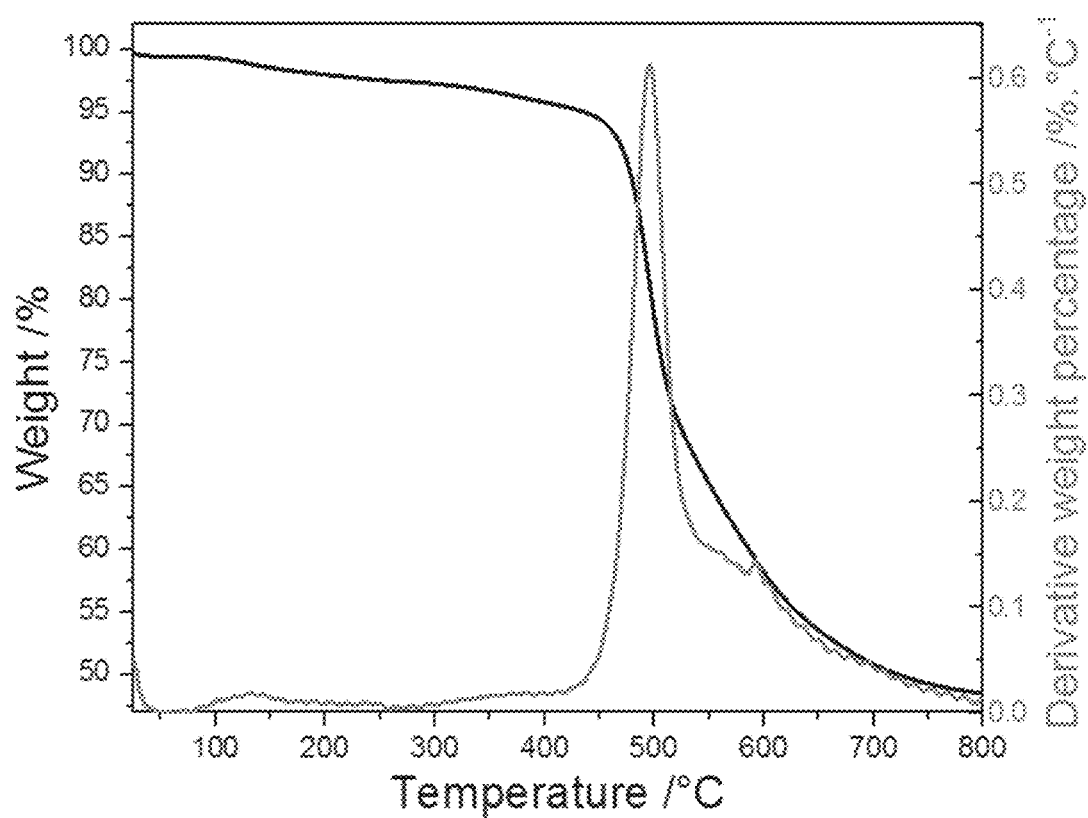
FIG. 7 is a graph depicting thermal gravimetrical analysis (TGA-DT) of the asymmetric PEI membrane with polysilsesquioxane and modified with $TiO_2$ nanoparticles.

The thermal properties and stability of the prepared membranes have been analyzed and the results are shown in FIGS. 6 and 7. The glass transition temperature measured by DSC, $T_g$, is 267° C. Practically no shift could be detected with the functionalization, as expected, since the amount or silane added is only around 10 wt %. The decomposition temperature measured by TGA, $T_d$, is around 495° C. for the modified membrane with functionalized $TiO_2$ nanoparticles. This makes this membrane able to operate at temperatures close to 260° C., conditions in which most of polymeric membranes are not stable enough.

The stability of the particle attachment was evaluated by washing the membranes for three days, continuously changing the water. The Ti/S and Si/S ratios evaluated by EDS are shown in Table 1 for all the samples before and after washing. The analyzed membranes are similar to those characterized in FIGS. 3b, 3e and 3f. It can be clearly seen that when $TiO_2$ particles are added without previously functionalization with epoxysilanes, the particles easily detach after strong washing since Ti/S ratio dramatically decreases. Different behavior is observed for the functionalized PEI membrane previously functionalized with epoxysilanes, which exhibited negligible change in the Ti/S and Si/S ratio, confirming the formation of strong link with covalent bond between the porous membrane and the functionalized $TiO_2$ particles.

TABLE 1

EDS analysis on the top of the membrane surfaces

| Membrane | Before Washing | | After Washing | |
| --- | --- | --- | --- | --- |
| | Ti/S wt ratio | Si/S wt ratio | Ti/S wt ratio | Si/S wt ratio |
| PEI/$TiO_2$ | 402 | 5.7 | 0.27 | 0.014 |
| PEI/ | | 3.6 | 0.37 | 3.3 | 0.36 |
| Polysilsesquioxane/$TiO_2$ | | | | |

$TiO_2$ has been reported to increase the fouling resistance of membranes, and has been explored as photocatalyst for pollutant conversion to less toxic products. However the effective use of $TiO_2$ particles for membrane modification only makes sense if their attachment is stable under operation and if the particles are well distributed and accessible in the membrane surface and pore walls. A new method of membrane functionalization has been proposed to address all these requirements. The method combines conventional phase inversion technology of asymmetric porous membrane preparation and reaction during the membrane coagulation. Hydrophilic ultrafiltration membranes with stable attachment of $TiO_2$ nanoparticles on the surface and in the pores with penetration depth around 2.5-3.5 μm were obtained.

REFERENCES (EACH OF WHICH IS INCORPORATED BY REFERENCE)

1. Kim, S. H., et al., *Design of TiO2 nanoparticle self-assembled aromatic polyamide thin-film-composite (TFC) membrane as an approach to solve biofouling problem.* Journal of Membrane Science, 2003. 211(1): p. 157-165.
2. Yang, Y., et al., *The influence of nano-sized TiO2 fillers on the morphologies and properties of PSF UF membrane.* Journal of Membrane Science, 2007. 288(1-2): p. 231-238.
3. Kwak, S.-Y., S. H. Kim, and S. S. Kim, *Hybrid Organic/Inorganic Reverse Osmosis (RO) Membrane for Bactericidal Anti-Fouling. 1. Preparation and Characterization of TiO2 Nanoparticle Self-Assembled Aromatic Polyamide Thin-Film-Composite (TFC) Membrane.* Environmental Science & Technology, 2001. 35(11): p. 2388-2394.
4. Madaeni, S. S. and N. Ghaemi, *Characterization of self-cleaning RO membranes coated with TiO2 particles under UV irradiation.* Journal of Membrane Science, 2007. 303(1-2): p. 221-233.
5. Syafei, A. D., C.-F. Lin, and C.-H. Wu, *Removal of natural organic matter by ultrafiltration with TiO2-coated membrane under UV irradiation.* Journal of Colloid and Interface Science, 2008. 323(1): p. 112-119.
6. Rahimpour, A., et al., *Coupling TiO2 nanoparticles with UV irradiation for modification of polyethersulfone ultrafiltration membranes.* Journal of Membrane Science, 2008. 313(1-2): p. 158-169.
7. Zhao, J., et al., *Surface modification of TiO2 nanoparticles with silane coupling agents.* Colloids and Surfaces A: Physicochemical and Engineering Aspects, 2011(0).
8. Li, J.-F., et al., *Effect of TiO2 nanoparticles on the surface morphology and performance of microporous PES membrane.* Applied Surface Science, 2009. 255(9): p. 4725-4732.
9. Razmjou, A., J. Mansouri, and V. Chen, *The effects of mechanical and chemical modification of TiO2 nanopar-* ticles on the surface chemistry, structure and fouling performance of PES ultrafiltration membranes. Journal of Membrane Science, 2011. 378(1-2): p. 73-84.
10. Razmjou, A., et al., *Titania nanocomposite polyethersulfone ultrafiltration membranes fabricated using a low temperature hydrothermal coating process.* Journal of Membrane Science, 2011. 380(1-2): p. 98-113.
11. Ranga Rao, A. and V. Dutta, *Low-temperature synthesis of TiO2 nanoparticles and preparation of TiO2 thin films by spray deposition.* Solar Energy Materials and Solar Cells, 2007. 91(12): p. 1075-1080.
12. Bergamasco, R., et al., *Drinking water treatment in a gravimetric flow system with TiO2 coated membranes.* Chemical Engineering Journal, 2011. 174(15 Oct. 2011): p. 102-109.
13. Pezzin, S. H., et al., *Modification of proton conductive polymer membranes with phosphorated polysilsesquioxanes.* Journal of Membrane Science, 2008. 325(2): p. 559-569.
14. Nunes, S. P., et al., *Inorganic modification of proton conductive polymer membranes for direct methanol fuel cells.* Journal of Membrane Science, 2002. 203(1-2): p. 215-225.
15. Nunes, S. P., et al., *Membranes of poly(ether imide) and nanodispersed silica.* Journal of Membrane Science, 1999. 157(2): p. 219-226.
16. Nistor, C., et al., *Organic-Inorganic CO2 Selective Membranes Prepared by the Sol-Gel Process.* Separation Science and Technology, 2009. 44(14): p. 3392-3411.
17. Ukaji, E. F., T.; Sato, M.; Suzuki, N., *The effect of surface modification with silane coupling agent on suppressing the photo-catalytic activity of fine TiO2 particles as inorganic UV filter.* Applied Surface Science, 2007. 254(2): p. 563-569.
18. Sabzi, M., et al., *Surface modification of TiO2 nano particles with silane coupling agent and investigation of its effect on the properties of polyurethane composite coating.* Progress in Organic Coatings, 2009. 65(2): p. 222-228.
19. Brinker, C. J., *Hydrolysis and Condensation of Silicates—Effects on Structure.* Journal of Non-Crystalline Solids, 1988. 100(1-3): p. 31-50.
20. Witucki, G. L., *A Silane Primer: Chemistry and Applications of Alkoxy Silanes.* Journal of Coatings Technology, 1993. 65(822): p. 57-60.
21. Cassie, A. B. D., *Contact angles.* Discussions of the Faraday Society, 1948. 3: p. 11-16.
22. Cassie, A. B. D. and S. Baxter, *Wettability of porous surfaces.* Transactions of the Faraday Society, 1944. 40: p. 546-551.
23. Wenzel, R. N., *Resistance of solid surfaces to wetting by water.* Industrial & Engineering Chemistry, 1936. 28(8): p. 988-994.
24. Huang, W., et al., *Superhydrophilic porous TiO2 film prepared by phase separation through two stabilizers.* Applied Surface Science, 2011. 257(11): p. 4774-4780.
25. Chau, T. T., et al., *A review of factors that affect contact angle and implications for flotation practice.* Advances in Colloid and Interface Science, 2009. 150(2): p. 106-115.

Other embodiments are within the scope of the following claims.

What is claimed is:

1. A method of manufacturing an asymmetric porous membrane, comprising:
forming a casting solution comprising an organic polymer and an inorganic polymer, wherein the casting solution is formed by dissolving the organic polymer in an organic solvent in the presence of a first silane and polymerizing the first silane to form the inorganic polymer, wherein the casting solution is formed in the absence of any nanoparticles;
forming a reactive non-solvent bath comprising surface functionalized nanoparticles dispersed in a non-solvent, wherein the reactive non-solvent bath is formed by mixing nanoparticles and a second silane in a non-solvent, wherein the nanoparticles include Ag, Au, titania, zirconia, ceria, a rare earth oxide, or silica and wherein the second silane is an amino silane; and
immersing the casting solution in the reactive non-solvent bath to form a modified asymmetric porous membrane with nanoparticles attached to a surface and/or pores of the asymmetric porous membrane.

2. The method of claim 1, wherein the first silane is tetraethylorthosilicate, silicon tetrachloride, silanol-terminated polydimethylsiloxane, chlorine-terminated polydimethylsiloxane, ethoxy-terminated polydimethylsiloxane, methoxy-terminated polydimethylsiloxane, triethoxysilylethyl-terminated polydimethylsiloxane, dimethylamino-terminated polydimethylsiloxane, (3-glycidyloxypropyl) trimethoxysilane, or N1-(3-trimethoxysilylpropyl) diethylenetriamine.

3. The method of claim 1, wherein the first silane is a Z-terminated alkoxy or halo silane in which Z is a moiety that is compatible with, soluble within, or reacts with at least one of the nanoparticles or a functional group on the nanoparticles, wherein Z is hydroxy, sulfhydryl, sulfinate, sulfinic acid, epoxy, sulfonate, sulfonic acid, disulphide, carboxyl, carboxylate, amine, amide, alkoxysilyl, halosilyl, phosphate, phosphonic acid, phosphonate ester, phosphinate, phosphinic acid, or phosphinate ester.

4. The method of claim 1, wherein the dissolved organic polymer includes polyethyleneimine.

5. A method of manufacturing a membrane, comprising:
forming a casting solution comprising an organic polymer and an inorganic polymer, wherein the casting solution is formed by dissolving the organic polymer in an organic solvent in the presence of a first silane and polymerizing the first silane to form the inorganic polymer, wherein the casting solution is formed in the absence of any nanoparticles,
forming a reactive non-solvent bath comprising surface functionalized nanoparticles dispersed in a non-solvent, wherein the reactive non-solvent bath is formed by mixing nanoparticles and a second silane in a non-solvent, and
immersing the casting solution in the reactive non-solvent bath to form an asymmetric membrane with the nanoparticles attached thereto, wherein the nanoparticles attach to the membrane via a reaction involving the inorganic polymer and surface functionalized nanoparticles.

6. The method of claim 5, wherein the nanoparticles include Ag, Au, titania, zirconia, ceria, a rare earth oxide, or silica.

7. The method of claim 5, wherein the surface functionalized nanoparticles comprise a functional group selected from the group consisting of a hydroxy, a thio, an amino, and a carboxy.

8. The method of claim 5, wherein the first silane is tetraethylorthosilicate, silicon tetrachloride, silanol-terminated polydimethylsiloxane, chlorine-terminated polydimethylsiloxane, ethoxy-terminated polydimethylsiloxane, methoxy-terminated polydimethylsiloxane, triethoxysilylethyl-terminated polydimethylsiloxane, dimethylamino-terminated polydimethylsiloxane, (3-glycidyloxypropyl) trimethoxysilane, N1-(3-trimethoxysilylpropyl) diethylenetriamine.

9. The method of claim 5, wherein the organic polymer is selected from polyolefins, ethylene-propylene rubbers, ethylene-propylene-diene monomer terpolymers (EPDM), polystyrenes, polyvinylchloride (PVC), polyamides, polyacrylates, celluloses, polyesters, polyethers, polysulphones, polyazoles, polyvinylhalides, polyhalocarbons, polyethyleneimine, polymers or copolymers of ethylene, propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, and methacrylic acid.

10. The method of claim 5, wherein the organic polymer is selected from polyetherimides, polyacrylonitriles, polysulfones, polyoxadiazoles, polytriazoles, and polyvinylfluorides.

11. The method of claim 5, wherein the surface functionalized nanoparticles are covalently attached to the asymmetric membrane.

12. The method of claim 5, wherein the inorganic polymer is a polysilsesquioxane network formed by a sol-gel process.

13. The method of claim 5, wherein the first silane is a Z-terminated alkoxy or halo silane in which Z is a moiety that is compatible with, soluble within, or reacts with at least one of the nanoparticles or a functional group on the nanoparticles; and wherein Z is hydroxy, sulfhydryl, sulfinate, sulfinic acid, epoxy, sulfonate, sulfonic acid, disulphide, carboxyl, carboxylate, amine, amide, alkoxysilyl, halosilyl, phosphate, phosphonic acid, phosphonate ester, phosphinate, phosphinic acid, or phosphinate ester.

14. The method of claim 5, wherein the first silane is an epoxy-terminated alkoxy or halo silane and the second silane is an amino silane.

15. The method of claim 14, wherein the epoxy group and amino group react to covalently attach the surface functionalized nanoparticles to the membrane.

16. The method of claim 14, wherein the first silane is glycidoxypropyltrimethoxysilane (GMS) and wherein the second silane is N1-(3-trimethoxysilylpropyl)diethylenetriamine.

17. The method of claim 5, wherein the nanoparticles are $TiO_2$ nanoparticles.

18. The method of claim 5, wherein the non-solvent is water.

19. The method of claim 5, wherein the organic polymer is a polyetherimide or a polyetherimide sulfone.

* * * * *